(12) United States Patent
Tsuchiya et al.

(10) Patent No.: US 8,496,845 B2
(45) Date of Patent: Jul. 30, 2013

(54) REFRIGERANT COMPOSITION COMPRISING DIFLUOROMETHANE (HFC32), PENTAFLUOROETHANE (HFC125) AND 2, 3, 3, 3-TETRAFLUOROPROPENE (HFO1234YF)

(75) Inventors: Tatsumi Tsuchiya, Settsu (JP); Katsuki Fujiwara, Settsu (JP); Masahiro Noguchi, Osaka (JP); Yasufu Yamada, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/001,847

(22) PCT Filed: Jun. 30, 2009

(86) PCT No.: PCT/JP2009/062243
§ 371 (c)(1),
(2), (4) Date: Dec. 29, 2010

(87) PCT Pub. No.: WO2010/002014
PCT Pub. Date: Jan. 7, 2010

(65) Prior Publication Data
US 2011/0108756 A1    May 12, 2011

Related U.S. Application Data

(60) Provisional application No. 61/129,499, filed on Jul. 1, 2008, provisional application No. 61/112,901, filed on Nov. 10, 2008.

(51) Int. Cl.
*C09K 5/04*    (2006.01)
(52) U.S. Cl.
USPC .......................................................... 252/67
(58) Field of Classification Search
USPC .......................................................... 252/67
See application file for complete search history.

(56) References Cited

U.S. PATENT DOCUMENTS

2004/0256594 A1    12/2004    Singh et al.
2008/0230738 A1*   9/2008     Minor et al. .................... 252/67

FOREIGN PATENT DOCUMENTS

| WO | 2005/105947 | 11/2005 |
| WO | 2006/094303 | 9/2006 |
| WO | 2007/002625 | 1/2007 |
| WO | 2007/126414 | 11/2007 |
| WO | 2008/027555 | 3/2008 |

OTHER PUBLICATIONS

International Search Report issued Oct. 16, 2009 in International (PCT) Application No. PCT/JP2009/062243.
Written Opinion of the International Searching Authority issued Oct. 16, 2009 in International (PCT) Application No. PCT/JP2009/062243, Aug. 2, 2011.
Onishi et al., "LCCP of Some HVAC & R Applications in Japan," Earth Technologies Forum, Japan Refrigeration and Air Conditioning Industry Association, pp. 1-18 (Apr. 2004).

* cited by examiner

*Primary Examiner* — John Hardee
(74) *Attorney, Agent, or Firm* — Wenderoth, Lind & Ponack, L.L.P.

(57) ABSTRACT

The present invention provides a refrigerant composition that is nonflammable, and ensures low LCCP and less burden on the environment. More specifically, the present invention relates a refrigerant composition containing difluoromethane (HFC32), pentafluoroethane (HFC125), and 2,3,3,3-tetrafluoropropene (HFO1234yf), the ratio of HFC32/HFC125/HFO1234yf being in a range surrounded by points (0/21/79 mass %), (16.6/25.3/58.1 mass %), and (0/28.4/71.6 mass %) in a ternary diagram of a refrigerant composition containing HFC32, HFC125, and HFO1234yf, and the composition essentially containing HFC32.

8 Claims, 2 Drawing Sheets

US 8,496,845 B2

REFRIGERANT COMPOSITION COMPRISING DIFLUOROMETHANE (HFC32), PENTAFLUOROETHANE (HFC125) AND 2, 3, 3, 3-TETRAFLUOROPROPENE (HFO1234YF)

This application claims priority based on U.S. Provisional Application Nos. 61/129,499 filed Jul. 1, 2008, and 61/112,901 filed Nov. 10, 2008.

TECHNICAL FIELD

The present invention relates to a mixed refrigerant composition comprising difluoromethane (HFC32), pentafluoroethane (HFC125), and 2,3,3,3-tetrafluoropropene (HFO1234yf), for use in refrigeration and air-conditioning systems.

BACKGROUND ART

With global warming becoming an increasingly serious issue worldwide, the development of environmentally friendly refrigeration and air-conditioning systems has become increasingly important. In addition to having an impact on global warming, refrigerants are greatly involved in the performance of refrigeration and air-conditioning systems. Therefore, refrigerant selection has an important role in reducing carbon dioxide emissions that contribute to global warming.

Recently, a variety of partially fluorinated propenes having a double bond in the molecule have been proposed. Such propenes have a lower global warming potential (GWP) compared with known chlorofluorocarbon (CFC), hydrochlorofluorocarbon (HCFC), and hydrofluorocarbon (HFC).

2,3,3,3-Tetrafluoropropene (HFO1234yf) is one such propene (see, for example, Patent Literatures 1 and 2). This refrigerant is flammable, and ignites at a concentration of 6.5 to 12.5 vol. % in air at 21° C. In addition, this refrigerant has a higher boiling point than HCFC22, which has been conventionally used in stationary air conditioners, and R407c and R410A, which have come into use as alternatives to HCFC22 and are uninvolved in the depletion of the ozone layer. For this reason, the refrigerating capacity cannot be maintained by the use of HFO1234yf alone.

In the selection of a refrigerant, a low global warming potential (GWP) of the refrigerant itself is obviously important; however, the energy use efficiency of the device using the refrigerant is equally, or more important. The former is evaluated as a direct environmental impact, and the latter as an indirect environmental impact. LCCP (Life Cycle Climate Performance) has been proposed as an objective index for these evaluations (Non-Patent Literature 1 etc.). Although LCCP is now widely recognized for use in the comprehensive evaluation of refrigerants, there have been no cases where LCCP evaluation has been performed to provide optimal refrigerants.

CITATION LIST

Patent Literature

PTL 1: WO 2005/105947
PTL 2: WO 2006/094303

Non Patent Literature

NPL 1: "LIFE CYCLE CLIMATE PERFORMANCE OF SOME APPLICATIONS IN JAPAN", HARUO ONISHI, 15$^{th}$ Annual Earth Technologies Forum and Mobile Air Conditioning Summit, Apr. 13-15, 2004 Conference Proceedings

SUMMARY OF INVENTION

Technical Problem

When a refrigerant having a high boiling point is used at a low operating pressure, the vapor compression refrigeration cycle has an insufficient capacity. Therefore, it is necessary to increase the size of the device etc. to ensure the desired cooling or heating capacity, which normally results in a deteriorated indirect impact due to pressure loss. Moreover, when the refrigerant is flammable, the use of a highly safe material in the electrical system is required, and an upper limit is set on the amount of the refrigerant to be charged into an apparatus.

An object of the present invention is to provide a refrigerant composition that is nonflammable, and ensures low LCCP and less burden on the environment.

Solution to Problem

The present inventors conducted extensive research in view of the above-mentioned problems, and found that these problems can be solved by using, in an apparatus that circulates a refrigerant via a compressor to form a refrigeration cycle, a refrigerant composition comprising difluoromethane (HFC32), pentafluoroethane (HFC125), and 2,3,3,3-tetrafluoropropene (HFO1234yf), the ratio of HFC32/HFC125/HFO1234yf being in a range surrounded by points (0/21/79 mass %), (16.6/25.3/58.1 mass %), and (0/28.4/71.6 mass %) in a ternary diagram of a composition comprising HFC32, HFC125, and HFO1234yf (FIG. 1), and the composition essentially containing HFC32.

The inventors also found that preferred is a refrigerant composition comprising the above components at a ratio in a range surrounded by points (3/22/75 mass %), (15/25/60 mass %), and (3/27/70 mass %); and particularly preferred is a composition comprising the above component at a ratio in a range surrounded by points (5/24/97 mass %), (3/24/73 mass %), (3/22/75 mass %), and (2/22/73 mass %) in the above ternary diagram (FIG. 1).

Here, the point expressed by (3/22/75 mass %) in the ternary diagram (FIG. 1), for example, means a composition that comprises 3 mass % of HFC32, 22 mass % of HFC125, and 75 mass % of HFO1234yf. The ranges surrounded by the above-described points in the ternary diagram include all possible proportions of the three components in the composition located on each side and inside the triangle or tetragon defined by the above three or four points.

The present invention was accomplished upon further studies based on these findings.

More specifically, the present invention provides the following nonflammable refrigerant composition.

Item 1. A refrigerant composition comprising difluoromethane (HFC32), pentafluoroethane (HFC125), and 2,3,3,3-tetrafluoropropene (HFO1234yf),
the ratio of HFC32/HFC125/HFO1234yf being in a range surrounded by points (0/21/79 mass %), (16.6/25.3/58.1 mass %), and (0/28.4/71.6 mass %) in a ternary diagram of a refrigerant composition containing HFC32, HFC125, and HFO1234yf, and
the composition essentially comprising HFC32.

Item 2. The refrigerant composition according to Item 1, wherein the ratio of HFC32/HFC125/HFO1234yf is in a range surrounded by points (3/22/75 mass %), (15/25/60 mass %), and (3/27/70 mass %) in the ternary diagram.

Item 3. The refrigerant composition according to Item 1 or 2, wherein the ratio of HFC32/HFC125/HFO1234yf is in a range surrounded by points (5/24/71 mass %), (3/24/73 mass %), (3/22/75 mass %), and (5/22/73 mass %) in the ternary diagram.

Item 4. The refrigerant composition according to any one of Items 1 to 3, further comprising a polymerization inhibitor.

Item 5. The refrigerant composition according to any one of Items 1 to 4, further comprising a drying agent.

Item 6. The refrigerant composition according to any one of Items 1 to 5, further comprising a stabilizer.

Item 7. A method of operating a refrigerator, comprising circulating the refrigerant composition according to any one of Items 1 to 6 via a compressor.

Item 8. A method of producing the refrigerant composition according to Item 2, comprising mixing difluoromethane (HFC32), pentafluoroethane (HFC125), and 2,3,3,3-tetrafluoropropene (HFO1234yf) so that the ratio of HFC32/HFC125/HFO1234yf is in a range surrounded by points (3/22/75 mass %), (15/25/60 mass %), and (3/27/70 mass %) in a ternary diagram of a refrigerant composition containing HFC32, HFC125, and HFO1234yf.

Item 9. A refrigerator comprising the refrigerant composition according to any one of Items 1 to 6.

Advantageous Effects of Invention

The refrigerant composition of the present invention provides the following effects:

(1) The refrigerant composition of the invention achieves the same or improved cycle performance compared to conventionally available refrigerants such as R407c or R410A when used as a refrigerant for a heat pump apparatus.

(2) Nonflammability of the refrigerant does not require any special changes in the specification of the device, including the use of safe and secure members.

(3) The refrigerant makes no contribution to ozone layer depletion even when the refrigerant is not completely collected after use, because its ozone depletion potential (ODP) is zero.

(4) The global warming potential (GWP) is less than those of conventionally-used refrigerants such as R407c and R410A.

(5) The refrigerant composition is excellent in LCCP evaluation, and its contribution to global warming is as low as, or lower than, that of conventionally available refrigerants such as R407c or R410A, when used as a refrigerant for a heat pump apparatus.

DESCRIPTION OF EMBODIMENTS

The present inventors conducted extensive research on the relationships of the mixing ratio of HFC32, HFC125, and HFO1234yf to LCCP (Life Cycle Climate Performance) and to flammability. LCCP and flammability are evaluated by the methods described in Test Examples 1 and 2, respectively.

Figure 1:
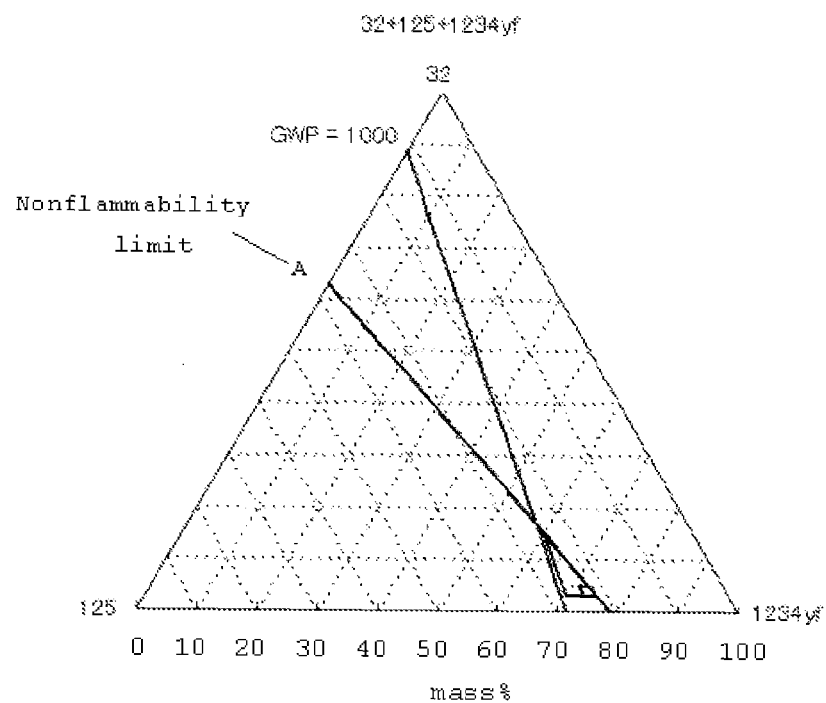
FIG. 1 is a ternary diagram showing the proportions of HFC32, HFC125, and HFO1234yf in a refrigerant composition.

The results of the evaluation revealed that when a refrigerant composition comprises HFC32, HFC125, and HFO1234yf at a ratio of HFC32/HFC125/HFO1234yf in a range surrounded by points (0/21/79 mass %), (16.6/25.3/58.1 mass %), and (0/28.4/71.6 mass %) in a ternary diagram of a refrigerant composition containing HFC32, HFC125, and HFO1234yf (FIG. 1), and when the refrigerant composition essentially comprises HFC32, the composition is nonflammable, and ensures low LCCP and less burden on the environment.

In other words, the refrigerant composition comprising HFC32, HFC125, and HFO1234yf is nonflammable, and ensures low LCCP and less burden on the environment, when each component ratio (a/b/c mass %) satisfies the following relations:

$$0<a\leq16.6 \quad (1)$$

$$(16/63 \times a+21)\leq b\leq((99600-671\times a)/3456) \quad (2)$$

$$c=100-a-b \quad (3)$$

These formulae are obtained by the mathematization of a range surrounded by a nonflammability limit line and GWP (Integration time horizon; ITH=100 yr)=1,000, and are supported by examples (see FIG. 1).

Moreover, the refrigerant composition exhibits more excellent effects when the above components are mixed so that the ratio of HFC32/HFC125/HFO1234yf is in a range surrounded by points (3/22/75 mass %), (15/25/60 mass %), and (3/27/70 mass %). In particular, when the ratio of HFC32/HFC125/HFO1234yf is in a range surrounded by points (5/24/71 mass %), (3/24/73 mass %), (3/22/75 mass %), and (5/22/73 mass %), the composition exhibits even more excellent effects.

The refrigerant composition of the present invention is nonflammable, and has a low GWP and excellent refrigerating capacity. For example, the GWP (ITH=100 yr) of the refrigerant composition is about 800 to 1,000, which is ½ or less that of R410AA (GWP: 2088) and 4/7 or less that of R407c (GWP: 1773).

The refrigerant composition of the present invention has high stability. If necessary, stabilizers may be added to meet the requirement of high stability under severe conditions.

Examples of usable stabilizers include (i) aliphatic nitro compounds such as nitromethane and nitroethane; aromatic nitro compounds such as nitrobenzene and nitrostyrene; (ii) ethers such as 1,4-dioxane; amines such as 2,2,3,3,3-pentafluoro propylamine and diphenylamine; butylhydroxyxylene, benzotriazole, etc. The stabilizers can be used singly or in a combination of two or more.

The amount of stabilizer used may vary depending on the type of stabilizer used, as long as it does not impair the performance of the nonflammable composition. Generally, the stabilizer is preferably used in an amount of about 0.01 to about 5 parts by weight, and more preferably about 0.05 to about 2 parts by weight, per 100 parts by weight of the mixture of HFC32, HFC125, and HFO1234yf.

The composition of the present invention may further contain a polymerization inhibitor. Examples thereof include 4-methoxy-1-naphthol, hydroquinone, hydroquinone methyl ether, dimethyl-t-butylphenol, 2,6-di-tert-butyl-p-cresol, benzotriazole, etc.

Generally, the polymerization inhibitor is preferably used in an amount of about 0.01 to about 5 parts by weight, and more preferably about 0.05 to about 2 parts by weight, per 100 parts by weight of the mixture of HFC32, HFC125, and HFO1234yf.

The composition of the present invention may further contain a drying agent.

The refrigerant composition of the present invention can be circulated via a compressor to form a refrigeration cycle. Additionally, an apparatus that circulates the refrigerant composition via a compressor to constitute a refrigeration cycle can be provided.

Examples of refrigerating systems that can use the refrigerant composition of the present invention include, but are not limited to, car air conditioners, refrigerating units for vending machines, industrial and household air-conditioners, gas heat pumps (GHP), and electrical heat pumps (EHP), and the like. Particularly, the refrigerant composition is effectively used in industrial and household air conditioners, whose downsizing is desired.

EXAMPLES

The present invention is described below with reference to examples; these examples, however, do not limit the scope of the invention.

Test Example 1

Using a composition comprising HFC32/HFC125/HFO1234yf (Example 1: 4/23/73 mass %, Example 2: 15/25/60 mass %, Example 3: 2/26/72 mass %, and Example 4: 10/25/65 mass %) as a refrigerant, a heat pump apparatus was operated under the following conditions:
[cooling rated] capacity: 4 kW, evaporating temperature of the refrigerant in the evaporator: 10° C., condensing temperature of the refrigerant in the condenser: 45° C.;
[cooling intermediate] capacity: 2 kW, evaporating temperature: 17° C., condensing temperature: 42° C.;
[heating rated] capacity: 5 kW, evaporating temperature: 0° C., condensing temperature: 42° C.;
[heating intermediate] capacity: 2.5 kW, evaporating temperature: 2° C., condensing temperature: 32° C.

Degrees of superheat and subcool were set to 0° C. in each condition.

As comparative examples, the heat pump apparatus was operated using R410AA (Comparative Example 1) and R407c (Comparative Example 2) under the same conditions as above.

As further comparative examples, the heat pump was operated using HFC32/HFC125/HFO1234yf (Comparative Example 3: 23/25/52 mass %, and Comparative Example 4: 15/45/40 mass %) under the same conditions as above.

The coefficient of performance (COP) was calculated on the basis of the obtained results. The COP, evaporation pressure, and condensation pressure are shown in Table 1. Subsequently, the results were used for calculating the annual power consumption (kWh) in conformity with JRA 4046: 2004, and LCCP evaluation has been performed (Table 2).

The coefficient of performance (COP) and LCCP were determined by the following formulae:

COP=(cooling capacity or heating capacity)/power consumption

LCCP=direct impact (kg-$CO_2$)+indirect impact (kg-$CO_2$)

Direct impact=(leakage during charging at a manufacturing plant)+(annual regular leakage)+(annual irregular leakage)+(leakage during servicing)+(leakage during disposal)

Indirect impact=($CO_2$ emissions during the use of the air-conditioning system)+($CO_2$ emissions during the production and transportation of the refrigerant)

More specifically, the direct impact and indirect impact are calculated by the following formulae:

Direct impact=$GWP \times M \times (1-\alpha) + GWP_{AE} \times M$

Indirect impact=$N \times E \times \beta$

GWP: global warming potential in terms of $CO_2$ per kg (kg-$CO_2$/kg), integration time horizon (ITH): 100 years
$GWP_{AE}$: additional GWP caused by release during production etc. (including those caused by leakage of by-products etc., and indirect release) (kg-$CO_2$/kg)
N: operation period of the system (year) N=12
M: amount (kg) charged into the system M=1.3
$\alpha$: recovery rate during disposal of the system (recovery amount/charge amount) $\alpha$=0.6
E: annual power consumption of the system (kWh/year)
$\beta$: $CO_2$ emissions necessary for 1 kWh power generation (kg-$CO_2$/kWh) $\beta$=0.378

In Table 2, the values of the global warming contribution $CO_2$ emission ratio (indirect impact, direct impact, and LCCP) of Examples 1 to 4 and Comparative Examples 2 to 4 are relative values (ratios) obtained by expressing the indirect impact, direct impact, and LCCP of Examples 1 to 4 and Comparative Examples 2 to 4, on the basis that the values of Comparative Example 1 (R410A) are considered to be 100.

In the evaluation of LCCP, which is an index coupled with direct and indirect impacts of carbon gas emissions, the refrigerant composition of the present invention showed equivalent or lower values compared with R410A and R407c. Accordingly, the refrigerant obviously has the least effect on the environment.

TABLE 1

| | Refrigerant | | COP | Evaporation pressure MPa | Condensation pressure MPa |
|---|---|---|---|---|---|
| Ex. 1 | HFC32/HFC125/HFO1234yf (4/23/73 mass %) | Cooling rated | 2.65 | 0.581 | 1.521 |
| | | Cooling intermediate | 4.81 | 0.699 | 1.416 |
| | | Heating rated | 3.68 | 0.430 | 1.415 |
| | | Heating intermediate | 5.02 | 0.456 | 1.132 |
| Ex. 2 | HFC32/HFC125/HFO1234yf (15/25/60 mass %) | Cooling rated | 3.01 | 0.712 | 1.852 |
| | | Cooling intermediate | 4.84 | 0.854 | 1.726 |
| | | Heating rated | 3.77 | 0.528 | 1.726 |
| | | Heating intermediate | 5.02 | 0.560 | 1.383 |

TABLE 1-continued

| | Refrigerant | | COP | Evaporation pressure MPa | Condensation pressure MPa |
|---|---|---|---|---|---|
| Ex. 3 | HFC32/HFC125/HFO1234yf (2/26/72 mass %) | Cooling rated | 2.56 | 0.572 | 1.496 |
| | | Cooling intermediate | 4.78 | 0.688 | 1.392 |
| | | Heating rated | 3.65 | 0.423 | 1.392 |
| | | Heating intermediate | 4.99 | 0.448 | 1.113 |
| Ex. 4 | HFC32/HFC125/HFO1234yf (10/25/65 mass %) | Cooling rated | 2.88 | 0.658 | 1.719 |
| | | Cooling intermediate | 4.83 | 0.790 | 1.601 |
| | | Heating rated | 3.74 | 0.487 | 1.600 |
| | | Heating intermediate | 5.02 | 0.517 | 1.283 |
| Comp. Ex. 1 | R410A | Cooling rated | 3.44 | 1.100 | 2.752 |
| | | Cooling intermediate | 4.92 | 1.307 | 2.564 |
| | | Heating rated | 3.90 | 0.823 | 2.562 |
| | | Heating intermediate | 5.09 | 0.863 | 2.054 |
| Comp. Ex. 2 | R407C | Cooling rated | 3.42 | 0.678 | 1.837 |
| | | Cooling intermediate | 5.11 | 0.821 | 1.705 |
| | | Heating rated | 3.99 | 0.495 | 1.706 |
| | | Heating intermediate | 5.20 | 0.526 | 1.350 |
| Comp. Ex. 3 | HFC32/HFC125/HFO1234yf (23/25/52 mass %) | Cooling rated | 3.14 | 0.792 | 2.051 |
| | | Cooling intermediate | 4.84 | 0.950 | 1.910 |
| | | Heating rated | 3.80 | 0.589 | 1.910 |
| | | Heating intermediate | 5.03 | 0.623 | 1.529 |
| Comp. Ex. 4 | HFC32/HFC125/HFO1234yf (15/45/40 mass %) | Cooling rated | 2.98 | 0.816 | 2.092 |
| | | Cooling intermediate | 4.74 | 0.978 | 1.952 |
| | | Heating rated | 3.70 | 0.609 | 1.952 |
| | | Heating intermediate | 4.95 | 0.642 | 1.564 |

TABLE 2

| | Refrigerant | GWP (ITH = 100 yr) | Global warming-contributing $CO_2$ emission ratio | | |
|---|---|---|---|---|---|
| | | | Indirect impact | Direct impact | LCCP |
| Ex. 1 | HFC32/HFC125/HFO1234yf (4/23/73 mass %) | 835 | 103.8 | 41.6 | 95.8 |
| Ex. 2 | HFC32/HFC125/HFO1234yf (15/25/60 mass %) | 979 | 102.5 | 48.3 | 95.4 |
| Ex. 3 | HFC32/HFC125/HFO1234yf (2/26/72 mass %) | 926 | 104.6 | 45.9 | 97.0 |
| Ex. 4 | HFC32/HFC125/HFO1234yf (10/25/65 mass %) | 945 | 102.9 | 46.7 | 95.6 |
| Comp. Ex. 1 | R410A | 2088 | 100 | 100 | 100 |
| Comp. Ex. 2 | R407C | 1774 | 97.8 | 85.4 | 96.2 |
| Comp. Ex. 3 | HFC32/HFC125/HFO1234yf (23/25/52 mass %) | 1032 | 102.0 | 50.9 | 95.3 |
| Comp. Ex. 4 | HFC32/HFC125/HFO1234yf (15/45/40 mass %) | 1678 | 104.1 | 80.9 | 101.1 |

Test Example 2

Figure 3:
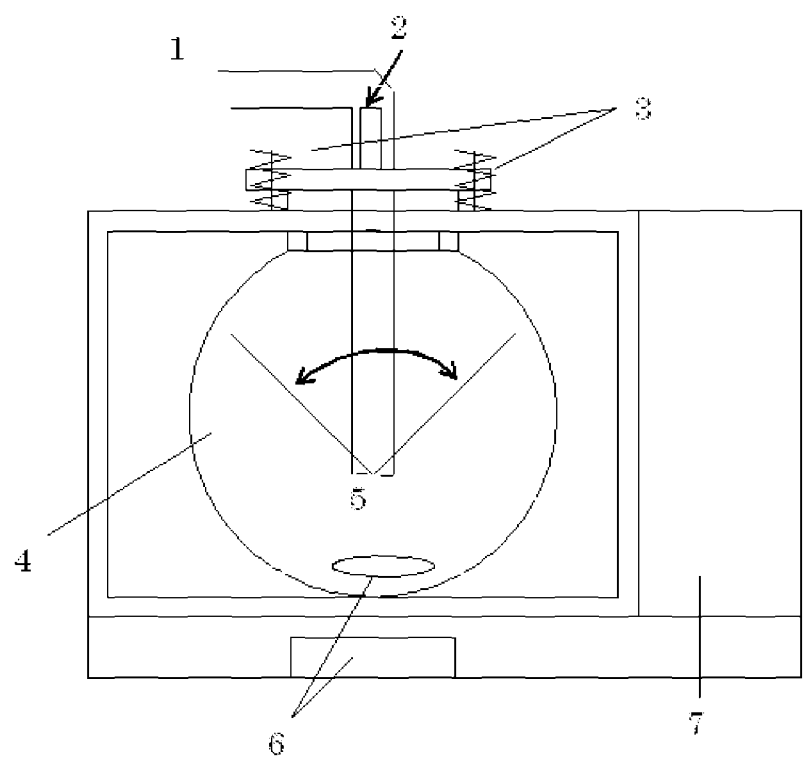
FIG. 3 schematically illustrates an apparatus used in the flammability test.

The flammability of the mixed refrigerant of the three components used in the refrigerant composition of the present invention was evaluated by measuring the flammable range using a measuring apparatus in accordance with ASTM E681-2001. See FIG. 3.

A 12-L spherical glass flask was used so that the combustion state can be visually observed and photographically recorded. During the generation of excessive pressure by combustion, gas was allowed to escape from an upper lid. Ignition was achieved by electrical discharge from electrodes held at one third of the distance from the bottom.

Test vessel: 280 mm φ spherical (internal volume: 12 liters)
Test temperature: 60° C. ±3° C.
Pressure: 101.3 kPa ±0.7 kPa
Water: 0.0088 g per gram of dry air ±0.0005 g
Mixing ratio of refrigerant/air: 1 vol. % increments ±0.2 vol. %
Refrigerant mixture: ±0.1 mass %
Ignition method: AC discharge
Electrode interval: 6.4 mm (¼ inch)
Spark: 0.4 sec. ±0.05 sec.
Evaluation criteria: when a flame extended at an angle of 90° or more from the ignition point, it was evaluated as flammable (propagation)

Figure 2:
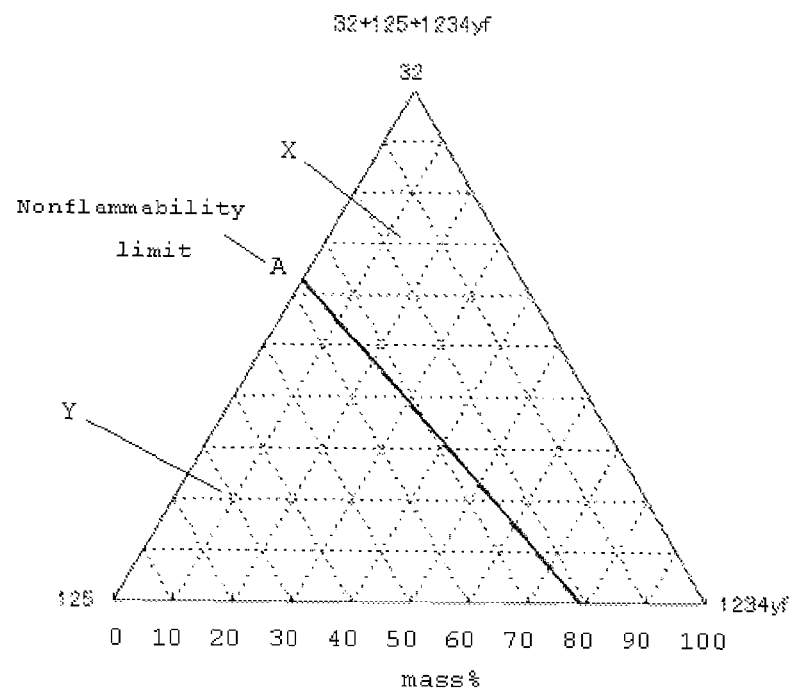
FIG. 2 shows the flammable range of a mixed system of HFC32, HFC125, and HFO1234yf.

FIG. 2 is the result showing the flammable range of the mixed system of HFC32, HFC125, and HFO1234yf. Each component ratio of HFC32, HFC125, and HFO1234yf (a/b/c mass %) in the nonflammability limit almost satisfied the relationship represented by the following formulae (4) to (6):

$$0 \leq a \leq 63 \quad (4)$$

$$b = (16/63 \times a + 21) \quad (5)$$

$$c = 100 - a - b \quad (6)$$

The result revealed that the refrigerant composition comprising HFC32/HFC125/HFO1234yf of the present invention is nonflammable, causing no combustion even when it is mixed with air in any ratio.

INDUSTRIAL APPLICABILITY

The mixed refrigerant composition of the present invention is effectively used in refrigeration and air-conditioning systems.

REFERENCE SIGNS LIST

A: Nonflammability limit line
X: Flammable region
Y: Nonflammable region
1: Ignition source
2: Sample inlet
3: Springs
4: 12-liter glass flask
5: Electrodes
6: Stirrer
7: Insulated chamber

The invention claimed is:

1. A composition comprising refrigerants, wherein the refrigerants are difluoromethane (HFC32), pentafluoroethane (HFC125), and 2,3,3,3-tetrafluoropropene (HFO1234yf),
the ratio of HFC32/HFC125/HFO1234yf is in a range surrounded by points (3/22/75 mass %), (15/25/60 mass %), and (3/27/70 mass %) in a ternary diagram of a refrigerant composition containing HFC32, HFC125, and HFO1234yf, and wherein the composition is nonflammable.

2. The composition according to claim 1, wherein the ratio of HFC32/HFC125/HFO1234yf is in a range surrounded by points (5/24/71 mass %), (3/24/73 mass %), (3/22/75 mass %), and (3/22/73 mass %) in the ternary diagram.

3. The composition according to claim 1, further comprising a polymerization inhibitor.

4. The composition according to claim 1, further comprising a drying agent.

5. The composition according to claim 1, further comprising a stabilizer.

6. A method of operating a refrigerator, comprising circulating the composition according to claim 1 via a compressor.

7. A method of producing the composition according to claim 1, comprising mixing difluoromethane (HFC32), pentafluoroethane (HFC125), and 2,3,3,3-tetrafluoropropene (HFO1234yf) so that the ratio of HFC32/HFC125/HFO1234yf is in a range surrounded by points (3/22/75 mass %), (15/25/60 mass %), and (3/27/70 mass %) in a ternary diagram of a refrigerant composition containing HFC32, HFC125, and HFO1234yf.

8. A refrigerator comprising the composition according to claim 1.

* * * * *